(12) United States Patent
Simada

(10) Patent No.: US 8,041,295 B2
(45) Date of Patent: Oct. 18, 2011

(54) MOBILE COMMUNICATION DEVICE

(75) Inventor: Hajime Simada, Yokohama (JP)

(73) Assignee: Panasonic Corporation, Osaka (JP)

( * ) Notice: Subject to any disclaimer, the term of this patent is extended or adjusted under 35 U.S.C. 154(b) by 939 days.

(21) Appl. No.: 11/909,793

(22) PCT Filed: Apr. 7, 2006

(86) PCT No.: PCT/JP2006/307476
§ 371 (c)(1),
(2), (4) Date: Sep. 26, 2007

(87) PCT Pub. No.: WO2006/109736
PCT Pub. Date: Oct. 19, 2006

(65) Prior Publication Data
US 2009/0061768 A1    Mar. 5, 2009

(30) Foreign Application Priority Data

Apr. 8, 2005   (JP) ................................. 2005-112248

(51) Int. Cl.
*H04B 5/02* (2006.01)
(52) U.S. Cl. ................ 455/41.1; 340/572.5; 340/572.7
(58) Field of Classification Search .................. None
See application file for complete search history.

(56) References Cited

U.S. PATENT DOCUMENTS

| | | | |
|---|---|---|---|
| 6,317,027 B1 * | 11/2001 | Watkins | 340/10.1 |
| 6,903,656 B1 * | 6/2005 | Lee | 340/572.1 |
| 2007/0095913 A1 * | 5/2007 | Takahashi et al. | 235/451 |

FOREIGN PATENT DOCUMENTS

| | | | |
|---|---|---|---|
| JP | 2003-046407 | | 2/2003 |
| JP | 2004-038657 | | 2/2004 |
| JP | 2004-102651 | | 4/2004 |
| JP | 2004-227315 | | 8/2004 |
| JP | 2004-280193 | | 10/2004 |
| JP | 2004-328605 | | 11/2004 |
| JP | 2004-342040 | | 12/2004 |
| JP | 2004-364199 | | 12/2004 |
| JP | 2005-073113 | | 3/2005 |
| JP | 2005-078381 | | 3/2005 |
| JP | 2005-092352 | | 4/2005 |
| JP | 2005-339507 | | 12/2005 |
| JP | 2005348241 A | * | 12/2005 |
| JP | 2006-217048 | | 8/2006 |
| WO | 03/061060 | | 7/2003 |

OTHER PUBLICATIONS

English translation of JP 2005-092352.*

* cited by examiner

*Primary Examiner* — Temesgh Ghebretinsae
*Assistant Examiner* — Gennadiy Tsvey
(74) *Attorney, Agent, or Firm* — Seed IP Law Group PLLC

(57) ABSTRACT

A mobile communication device capable of reducing a size of a proximity noncontact communication antenna and improving a proximity noncontact communication distance is provided. In a mobile communication device having both functions of a card function and a reader/writer function as a proximity noncontact communication and equipped with at least two proximity noncontact communication antennas or more for respective functions, a switching controlling portion 4 and a proximity noncontact communication controlling portion 5 for switching tuning circuits 3A, 3B of antennas 2A, 2B based on external equipments (an external proximity noncontact communication reader/writer and an external proximity noncontact communication card) that perform the proximity noncontact communication are provided.

4 Claims, 6 Drawing Sheets

FIG. 6 *(Prior Art)*
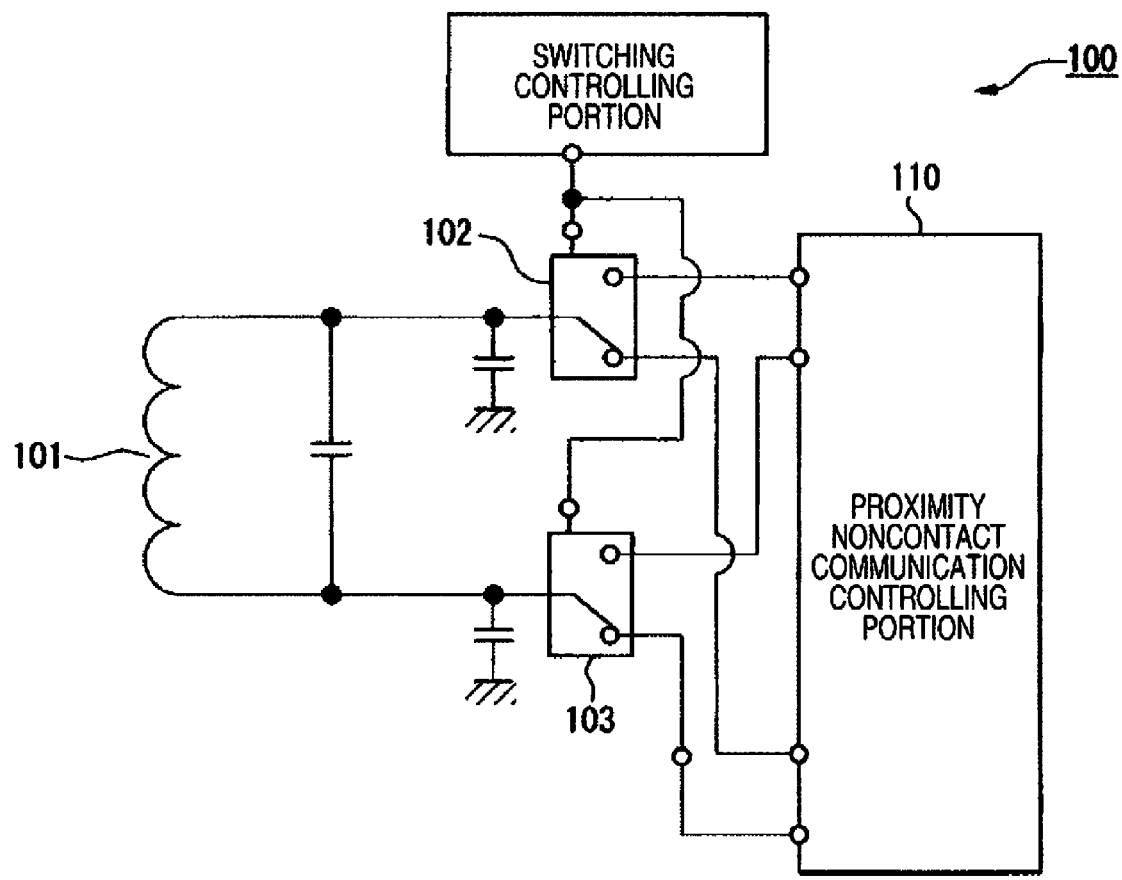
FIG. 7 *(Prior Art)*
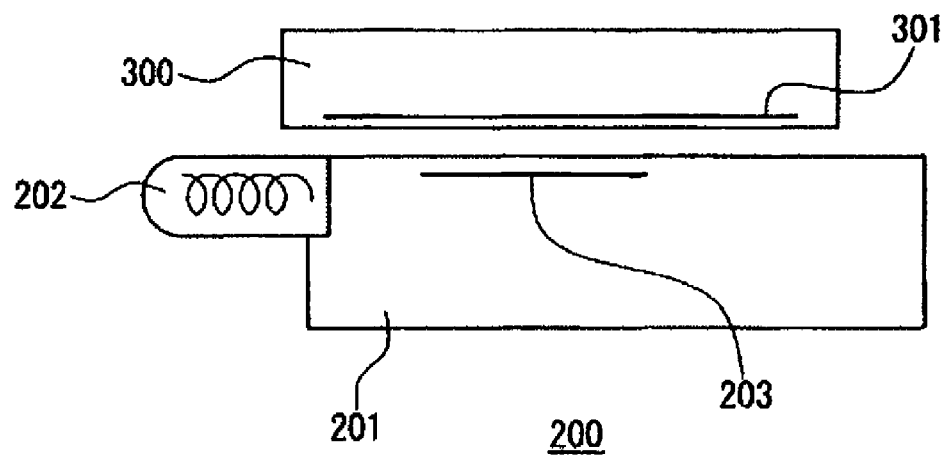

MOBILE COMMUNICATION DEVICE

TECHNICAL FIELD

The present invention relates to a mobile communication device having a function of performing a proximity noncontact communication with a plurality of external devices.

BACKGROUND ART

Nowadays a demand for development of a communication system for performing communication with a communication object, to which this system is brought close to such an extent that this system contacts or closely contacts the communication object (concretely, which is positioned in the proximity area within a distance of almost 10 cm or less where an electric field or a magnetic field can act), by utilizing an electric field or a magnetic field (referred to as a "proximity noncontact communication system" hereinafter) is growing. In other words, this communication system can be used in such a manner that electric data in which personal information, e.g., data such as a phone book, or the like are stored are copied into a cellular phone; an electronic medical chart is read/written in a hospital, a pharmacy, or the like; electric resident's register data of a certificate of residence, a family register, or the like is read/claimed, or the like; personal hobby data (various data such as music, image, and the like) are transferred/copied/stored in user's own cellular phone, or the like; money data is input into a desired electronic device as a prepaid money for a vending machine, or the like; money data is used as a pass to pass a gate in an amusement park, a station, or the like, and others. For this purpose, a development of a mobile communication device having a proximity noncontact communicating function has been variously discussed. This function makes it possible for the user to perform the proximity noncontact communication with a proximity noncontact communication equipment on the outside (referred to as an "external proximity noncontact communication equipment" hereinafter), a proximity noncontact communication card on the outside (referred to as an "external proximity noncontact communication card" hereinafter), or the like as the other end of the proximity noncontact communication.

As one of the mobile communication devices that are compatible with such proximity noncontact communication system, a development of the cellular phone to which a proximity noncontact communicating function is attached is proceeding. For example, FIG. 6 shows a circuit of a proximity noncontact communication portion 100 in the cellular phone to which a proximity noncontact communicating function is attached. Since this proximity noncontact communication portion 100 is constructed by one antenna 101 such that respective frequency bands overlap each other when the proximity noncontact communication is held between the cellular phone and the external proximity noncontact communication equipment and the external proximity noncontact communication card (both not shown), two functions for the external proximity noncontact communication equipment and the external proximity noncontact communication card can be provided while taking account of a miniaturization of the cellular phone.

Here, when the proximity noncontact communication is held between the external proximity noncontact communication equipment and the cellular phone, the proximity noncontact communication portion 100 installed into the cellular phone serves as a card. In contrast, when the proximity noncontact communication is held between the external proximity noncontact communication card and the cellular phone, the proximity noncontact communication portion 100 installed into the cellular phone serves as a reader/writer.

Also, control of the proximity noncontact communication is largely different between the card function and the reader/writer function. Therefore, as shown in FIG. 6, the card function and the reader/writer function are controlled separately by a proximity noncontact communication controlling portion (proximity noncontact communication IC) 110 that executes operation control respectively, and also connection terminals of the antenna 101 are provided separately. As a result, even though the antenna 101 is constructed as a single unit, a connection of the antenna 101 must be switched to respond to respective functions and also a switch 102 and a switch 103 must be provided.

By the way, these switches 102, 103 must be arranged in series with the proximity noncontact communication antenna 101 and the proximity noncontact communication controlling portion (proximity noncontact communication IC) 110. At that time, such a problem existed that an available distance in the proximity noncontact communication is shortened by the influence of the series-inserted switches. Therefore, an approach for extending the available distance by enlarging an area of the antenna may be considered. In this case, such a problem existed that a size of the mobile communication device itself is also increased when the area of the antenna is enlarged.

For this reason, the proximity noncontact communication system in which the antenna is provided separately to the external proximity noncontact communication equipment and the external proximity noncontact communication card respectively and a size reduction of the antenna can be attained by forming two antennas on the same plane is developed variously (see Patent Literature 1, for example).

As one of the mobile communication devices that are compatible with such proximity noncontact communication system, a development of the cellular phone to which the proximity noncontact communicating functions shown in FIG. 7 to FIG. 9, for example, are attached is examined. As shown in FIG. 7, the cellular phone having a straight main case 201 (of course, a folding type may be employed) and equipped with a cellular phone antenna 202 and a proximity noncontact communication antenna 203 (constructed by external proximity noncontact communication equipment antennas 203A, 203B) has been proposed. This cellular phone antenna 202 is provided in the main case 201 to transmit/receive the data to/from a base station (not shown). This proximity noncontact communication antenna 203 is provided near one surface (upper surface in FIG. 7 and FIG. 8) of the main case 201 to perform the proximity noncontact communication with an external proximity noncontact communication equipment 300. Also, this external proximity noncontact communication equipment 300 acting as the other end of the proximity noncontact communication with a cellular phone 200 is equipped with a proximity noncontact communication antenna 301.

Also, as shown in FIG. 8, the cellular phone that performs the proximity noncontact communication with an external proximity noncontact communication card 400 via a proximity noncontact communication antenna 401 has been proposed. This proximity noncontact communication antenna 401 is provided to the external proximity noncontact communication card 400 to establish the proximity noncontact communication with this cellular phone 200.

In this manner, the cellular phone 200 having a proximity noncontact communicating function of transmitting/receiving phone conversation or data communication to/from a base station via the cellular phone antenna 202. Meanwhile, when the proximity noncontact communication is established between the external proximity noncontact communication equipment 300 and the external proximity noncontact communication card 400 and the cellular phone 200, the external proximity noncontact communication equipment antennas 203A, 203B are brought into contact with or held closely to the external proximity noncontact communication equipment 300 and the external proximity noncontact communication card 400. Thus, the proximity noncontact communication is established between the external proximity noncontact communication equipment antenna 203A and the proximity noncontact communication antenna 301 in the external proximity noncontact communication equipment 300 or between the external proximity noncontact communication equipment antenna 203B and the proximity noncontact communication antenna 401 in the external proximity noncontact communication card 400.

Also, the proximity noncontact communication antenna 203 whose antennas 203A, 203B are formed on the same plane is studied.

As shown in FIG. 9, the external proximity noncontact communication equipment antenna 203A is connected to a first antenna tuning capacitor 206A via connection terminals 204A, 205A. Also, the external proximity noncontact communication equipment antenna 203A is connected to second antenna tuning capacitors 207A, 208A through respective connection terminals, and is also connected to the controlling portion 110 for controlling the proximity noncontact communication.

In contrast, the external proximity noncontact communication card antenna 203B is connected to a first antenna tuning capacitor 206B via connection terminals 204B, 205B. Also, the external proximity noncontact communication card antenna 203B is connected to second antenna tuning capacitors 207B, 208B through respective connection terminals, and is also connected to the controlling portion 110 for controlling the proximity noncontact communication.

Patent Literature 1: JP-A-2004-364199

DISCLOSURE OF THE INVENTION

Problems that the Invention is to Solve

However, when two antennas for the card function and the reader/writer function are provided on the same plane, such two antennas for the card function and the reader/writer function are positioned in close vicinity to each other and are coupled mutually. Therefore, a gain of the antenna is decreased rather than the case where respective antennas are provided separately independently. As a result, there existed such a problem that an available range in the proximity noncontact communication is shortened and the desired communication characteristics cannot be obtained.

Therefore, it is tried that the gain of the antenna should be improved by increasing an aperture area of the antenna to ensure a communication distance of a predetermined value or more in the proximity noncontact communication. However, as explained above, such a problem is caused that, when the aperture area of the antenna is increased, a size of the mobile communication device is increased or a design property is spoiled.

The present invention has been made to solve such problems in the prior art, and it is an object of the present invention to provide a mobile communication device capable of avoiding a reduction in an available distance in performing a proximity noncontact communication due to the coupling between plural antennas even when plural antennas are provided to perform the proximity noncontact communication with external equipments.

Means for Solving the Problems

A mobile communication device of the present invention includes a mobile communication portion for performing a mobile communication, a noncontact communication portion for performing a noncontact communication with a plurality of external equipments, antennas and antenna tuning circuits provided on a same plane of the noncontact communication portion to correspond to the plurality of external equipments; a switching unit for switching the antenna tuning circuit based on the plurality of external equipments when the noncontact communication portion performs a noncontact communication with the external equipment; and a controlling unit for controlling the noncontact communication portion. According to this configuration, when this communication equipment performs the noncontact communication with the external equipments, the antenna tuning circuits are switched to correspond to the external equipments. Therefore, a mutual coupling can be reduced and a reduction of a noncontact communication range can be prevented.

A mobile communication device of the present invention includes a mobile communication portion for performing a mobile communication, a proximity noncontact communication portion for performing proximity noncontact communications with an external proximity noncontact communication card and an external proximity noncontact communication reader/writer, antennas and antenna tuning circuits provided respectively on a same plane of the proximity noncontact communication portion to correspond to the external proximity noncontact communication card and the external proximity noncontact communication reader/writer; a switching unit for switching two antenna tuning circuits provided to the proximity noncontact communication portion based on communications with the external proximity noncontact communication card and the external proximity noncontact communication reader/writer when the proximity noncontact communication portion performs the noncontact communications with the external proximity noncontact communication card and the external proximity noncontact communication reader/writer; and a controlling unit for controlling the proximity noncontact communication portion. According to this configuration, when this communication equipment performs the noncontact communications with the external equipments, i.e., the external proximity noncontact communication card and the external proximity noncontact communication reader/writer, the antenna tuning circuits are switched based on the external equipments. Therefore, a mutual coupling generated because an antenna for the external proximity noncontact communication equipment and an antenna for the external proximity noncontact communication card are arranged in close vicinity to each other can be reduced and a reduction of a noncontact communication range can be prevented.

ADVANTAGES OF THE INVENTION

According to the present invention, even when plural antennas are provided on the same plane in close proximity to each other, the antenna tuning circuits can be switched by controlling a switching unit of the mobile communication device in response to the external equipments, and the switching of the antenna tuning circuits can be executed at a portion that has no influence on a gain of the antenna. Therefore, a small-size and high-gain antenna for the proximity noncontact communication for use in the mobile communication device can be formed, and also the mobile communication device that can keep a proximity noncontact communication distance long to some extent can be provided.

BRIEF DESCRIPTION OF THE DRAWINGS

FIG. 6 A block diagram showing a configuration of a proximity noncontact communication portion of a mobile communication device in the prior art.

FIG. 7 An explanatory view showing a state of a cellular phone in the prior art when a proximity noncontact communication is established between an external proximity noncontact communication equipment and this cellular phone.

Figure 1:
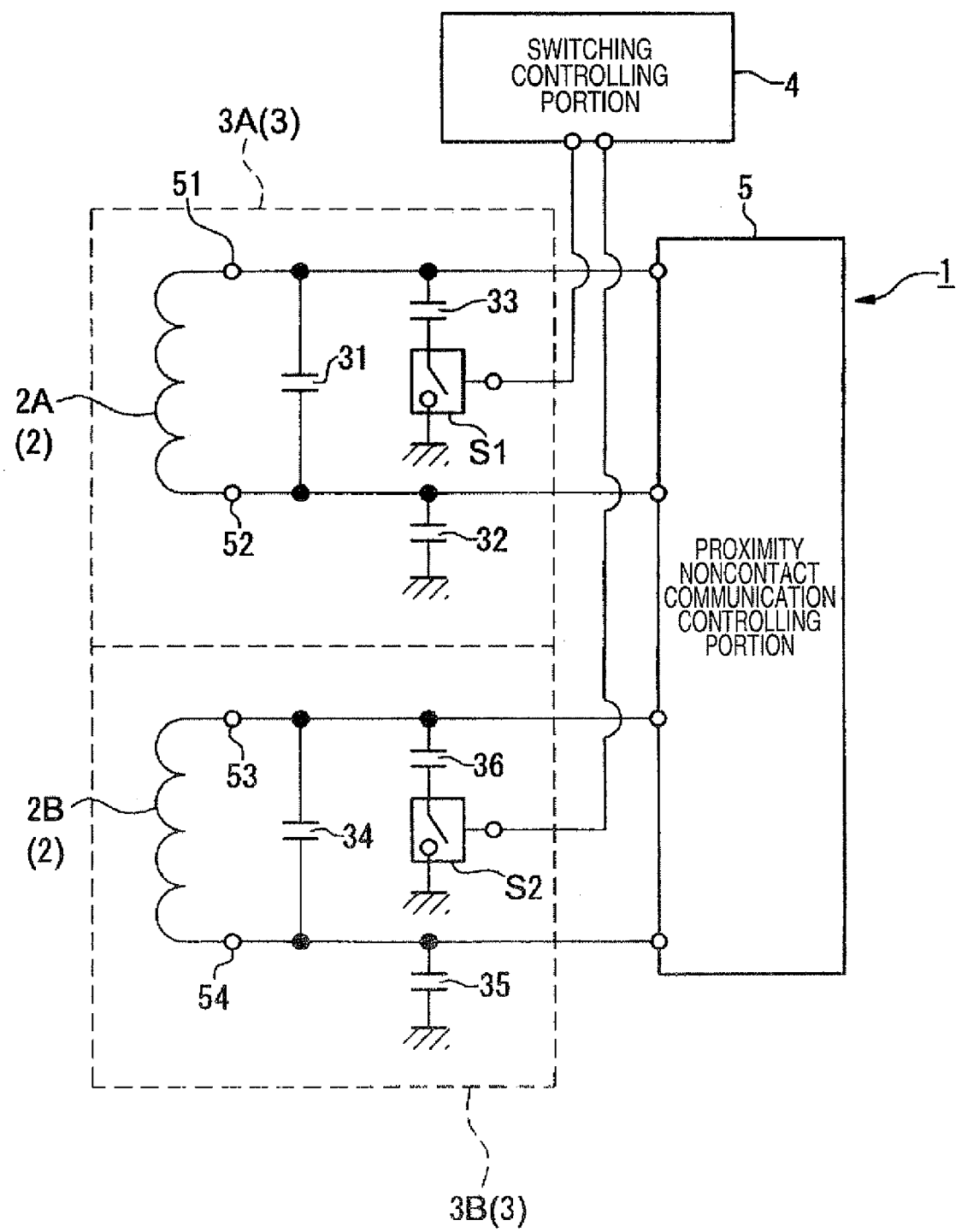
FIG. 1 A block diagram showing a configuration of a proximity noncontact communication portion of a mobile communication device according to a first embodiment of the present invention.

DESCRIPTION OF REFERENCE NUMERALS AND SIGNS 1 proximity noncontact communication portion
2 proximity noncontact communication antenna
2A first proximity noncontact communication antenna (first antenna)
2B second proximity noncontact communication antenna (second antenna)
3 antenna tuning circuit
3A antenna tuning circuit for an external proximity noncontact communication equipment (communication equipment tuning circuit)
3B antenna tuning circuit for an external proximity noncontact communication card (communication card tuning circuit)
31 first tuning capacitor
32, 33 second tuning capacitor
34 first tuning capacitor
35, 36 second tuning capacitor
4 switching controlling portion (switching unit)
5 proximity noncontact communication controlling portion
51, 52, 53, 54 terminal
S1 to S4 switch
300 external proximity noncontact communication reader/writer (external equipment)
400 external proximity noncontact communication card (external equipment)

BEST MODE FOR CARRYING OUT THE INVENTION

Embodiments of the present invention will be explained in detail with reference to the accompanying drawings hereinafter.

First Embodiment

FIG. 1 shows a mobile communication device according to a first embodiment of the present invention. This mobile communication device includes a mobile communicating portion (not shown) having a cellular phone function as the normal cellular phone, and a proximity noncontact communication portion 1 having a proximity noncontact communication function as the mobile communication device. Such mobile communicating portion executes a mobile communication via a cellular phone antenna (not shown). Such proximity noncontact communication portion 1 executes a proximity noncontact communication via a proximity noncontact communication antenna 2.

As shown in FIG. 1 the proximity noncontact communication portion 1 has a proximity noncontact communication antenna 2, a switching controlling portion 4 as a switching unit, and a proximity noncontact communication controlling portion 5 as a controlling unit, in the inside of a case (either a straight shape or a foldable shape may be employed) (not shown). This switching controlling portion 4 switches an antenna tuning circuit 3 in response to the external proximity noncontact communication reader/writer 300 or the external proximity noncontact communication card 400 when this mobile communication device performs a proximity noncontact communication with the external proximity noncontact communication reader/writer 300 (see FIG. 7) and the external proximity noncontact communication card 400 (see FIG. 8) as the external equipment. This proximity noncontact communication controlling portion 5 executes various controls in the proximity noncontact communication.

The cellular phone antenna is the ordinary cellular phone antenna. This mobile communication device carries on a conversation or a data communication with a base station (not shown) via this cellular phone antenna.

Figure 2:
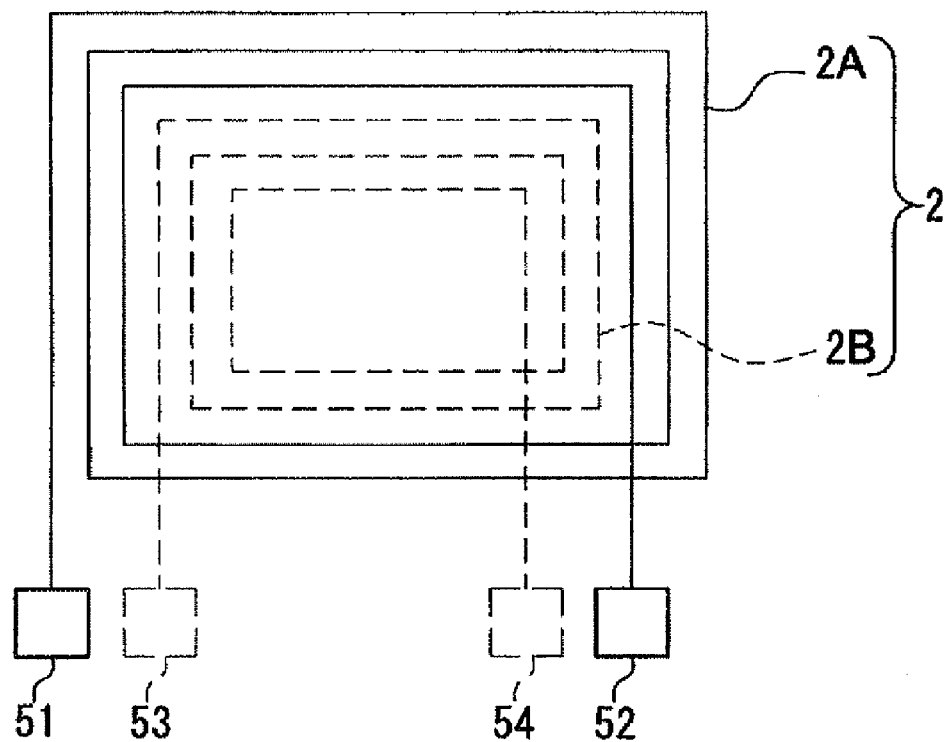
FIG. 2 A pattern view showing a configuration of a proximity noncontact communication antenna according to the first embodiment of the present invention.

Meanwhile, the proximity noncontact communication antenna 2 is arranged in the case as close to a proximity noncontact communication surface as possible. The proximity noncontact communication is established between the antenna 301 of the external proximity noncontact communication reader/writer 300 and the antenna 401 of the external proximity noncontact communication card 400 and the proximity noncontact communication antenna 2 via the proximity noncontact communication surface. As shown in FIG. 2, the proximity noncontact communication antenna 2 is constructed by a proximity noncontact communication antenna (referred to as a "first antenna" hereinafter) 2A and a proximity noncontact communication antenna (referred to as a "second antenna" hereinafter) 2B. FIG. 2 shows a state of antenna patterns, when viewed from the top, that are formed as multiple layers such as two layers or more. In the present embodiment, the first antenna 2A is wound into three turns and also the second antenna 2B is wound into three turns. But the number of turns is not limited to them.

The antenna tuning circuit 3 is constructed by an antenna tuning circuit (referred to as a "communication equipment tuning circuit" hereinafter) 3A for the external proximity noncontact communication equipment, and an antenna tuning circuit (referred to as a "communication card tuning circuit" hereinafter) 3B for the external proximity noncontact communication card. Terminals 51, 52 are used as the terminal to connect the communication equipment tuning circuit 3A and the controlling portion 5. In contrast, terminals 53, 54 are used as the terminal to connect the communication card tuning circuit 3B and the controlling portion 5.

The switching controlling portion 4 switches an antenna circuit contained in the noncontact communication portion in response to the external proximity noncontact communication reader/writer 300 and the external proximity noncontact communication card 400 when the proximity noncontact communication is established between the external equipment (the external proximity noncontact communication reader/writer 300 and the external proximity noncontact communication card 400) and this mobile communication device by the proximity noncontact communication portion 1. The details thereof will be described later. The controlling portion 5 executes various controls in the proximity noncontact communication. The details thereof will be described later.

As explained in the "Background Art", the external proximity noncontact communication reader/writer 300 performs the proximity noncontact communication with the mobile communication device 200. The proximity noncontact communication antenna 301 is provided in the inside near the opposing surface (portion corresponding to the lower surface in FIG. 7) to the mobile communication device 200.

Figure 8:
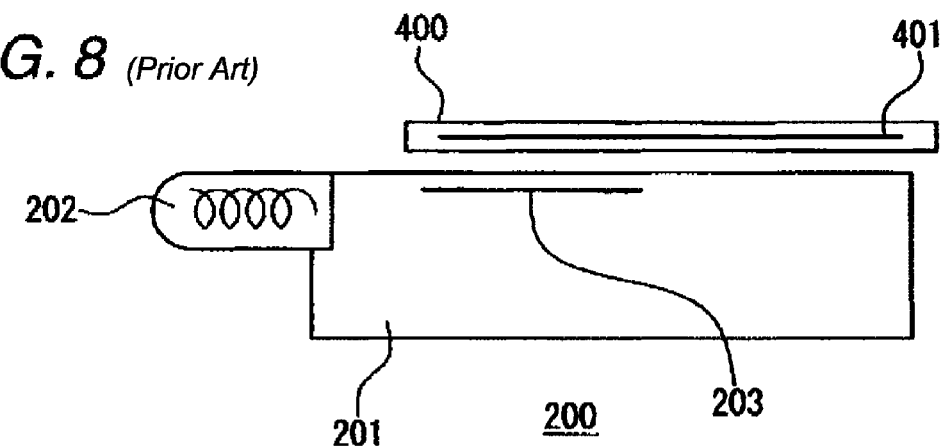
FIG. 8 An explanatory view showing a state of a cellular phone in the prior art when a proximity noncontact communication is established between an external proximity noncontact communication card and this cellular phone.
Figure 9:
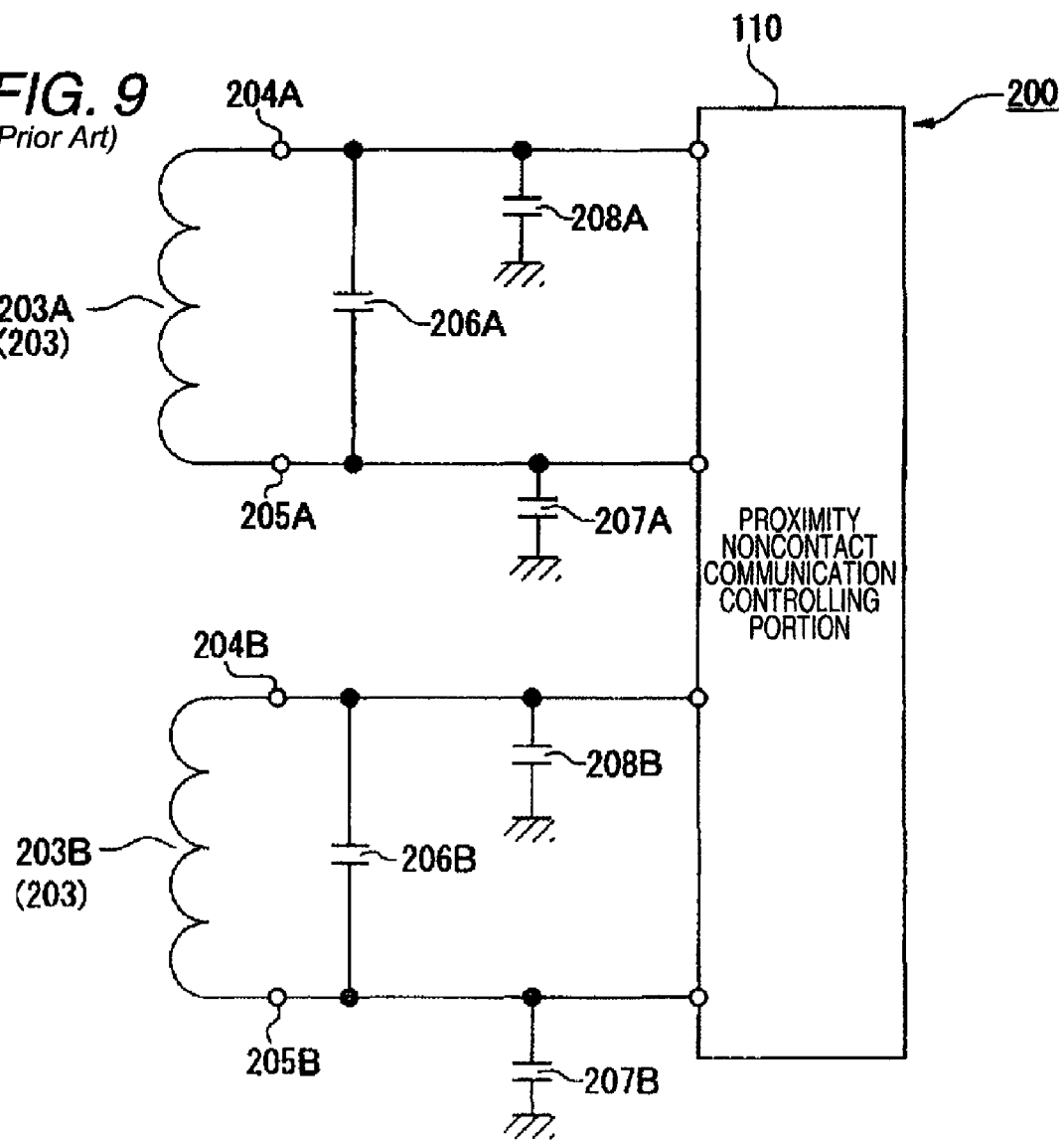
FIG. 9 A circuit diagram showing a pertinent configuration of a cellular phone having a proximity noncontact communicating function in the prior art.

Also, the external proximity noncontact communication card 400 performs the proximity noncontact communication with the mobile communication device 200 in FIG. 8. The proximity noncontact communication antenna 401 is provided in the inside near the opposing surface (portion corresponding to the lower surface in FIG. 8) to the mobile communication device 200.

Here, the "proximity noncontact communication" performs the communication by utilizing an electric field or a magnetic field, as described in the "Background Art". As well known, a magnetic force and an electric force are one type of forces that follow the Coulomb's law, and its force is reduced sharply in a short range because such force is in inverse proportion to the square of a distance (follows the inverse square law). Suppose that the "proximity noncontact communication" of the present invention signifies the communication that is held exclusively in a proximity area of 10 cm or less, within which the magnetic force or the electric force can act.

Next, the proximity noncontact communication antenna 2, the antenna tuning circuit 3, and the like will be explained in detail hereunder.

As described above, the proximity noncontact communication antenna 2 of the present embodiment is constructed by the first antenna 2A and the second antenna 2B. In FIG. 1, the first antenna 2A is connected to a first tuning capacitor 31 provided in the communication equipment tuning circuit 3A via the terminals 51, 52, and also connected to second tuning capacitors 32, 33 provided in the communication equipment tuning circuit 3A via the terminals 51, 52. Also, the first antenna 2A is connected to the proximity noncontact communication controlling portion 5, which controls the proximity noncontact communication, through respective terminals 51, 52.

Also, a terminal of the second tuning capacitor 33, which is opposite to a terminal that is connected to the antenna connection terminal 51, is connected to a switch S1 that is connected to GND or disconnected from GND. This switch S1 is controlled by the switching controlling portion 4. This switch S1 is connected to the second tuning capacitor 33, but this switch S1 may be connected to another second tuning capacitor 32.

In particular, when the proximity noncontact communication is started, the antenna and the antenna tuning circuit must be designed to resonate with a specified frequency. In this case, the first antenna 2A used as the external proximity noncontact communication equipment antenna acts as an inductance component, and the first tuning capacitor 31 and the second tuning capacitors 32, 33 are designed in total to resonate with a specified frequency. Therefore, if a part of the antenna tuning circuit 3 is set to an inoperative state, a resonance frequency can be shifted from the specified frequency. In other words, the resonance frequency can be changed into a frequency that is different from a resonance frequency of the second antenna 2B arranged on the same plane, and a coupling between the first antenna 2A and the second antenna 2B can be reduced.

Also, the first tuning capacitor 31 needs a high quality factor Q. Therefore, when the switch S1 is provided to the first tuning capacitor 31, a quality factor Q of the antenna tuning circuit is deteriorated in the communication with the external proximity noncontact communication equipment equipped with the first antenna 2A. Accordingly, a gain of the antenna is deteriorated and a communicable range in the proximity noncontact communication is shortened. Therefore, the present invention is constructed such that the switch S1 is provided to the second tuning capacitor 33 that exerts no influence upon a gain of the antenna.

In contrast, in FIG. 1, the second antenna 2B serving as the external proximity noncontact communication card antenna is connected to a first tuning capacitor 34 via the terminals 53, 54, and is connected to second tuning capacitors 35, 36 via the terminals 53, 54. Also, the second antenna 2B is connected to the proximity noncontact communication controlling portion 5, which controls the proximity noncontact communication, through the terminals 53, 54. Also, a terminal of the second tuning capacitor 36, which is opposite to a terminal that is connected to the antenna connection terminal 53, is connected to a switch S2 that is connected to GND or disconnected from GND. This switch S2 is controlled by the switching controlling portion 4. This switch S2 is connected to the second tuning capacitor 36, but this switch S2 may be connected to the second tuning capacitor 35.

In particular, when the proximity noncontact communication is started, the antenna and the antenna tuning circuit must be designed to resonate with a specified frequency. In this case, the second antenna 2B used as the external proximity noncontact communication card antenna acts as an inductance component, and the first tuning capacitor 34 and the second tuning capacitors 35, 36 are designed in total to resonate with a specified frequency. Therefore, like the first antenna 1A, if a part of the antenna tuning circuit 3 is set to an inoperative state, a resonance frequency can be shifted from the specified frequency. In other words, the resonance frequency can be changed into a frequency that is different from a resonance frequency of the first antenna 2A arranged on the same plane, and a coupling between the first antenna 2A and the second antenna 2B can be reduced.

Also, like the first antenna 1A, the first tuning capacitor 34 needs a high quality factor Q. Therefore, when the switch S2 is provided to the first tuning capacitor 34, a quality factor Q of the antenna tuning circuit is deteriorated in the communication with the external proximity noncontact communication equipment equipped with the second antenna 2B. Accordingly, a gain of the antenna is deteriorated and a communicable range in the proximity noncontact communication is shortened. Therefore, the present invention is constructed such that the switch S2 is provided to the second tuning capacitor 36 that exerts no influence upon a gain of the antenna.

According to the present embodiment, when the mobile communication device 1 performs the proximity noncontact communication with the external proximity noncontact communication equipment 300, the switching controlling portion 4 controls respective switches in such a way that the switch S1 is connected to GND and the switch S2 is disconnected from GND. Also, when the mobile communication device 1 performs the proximity noncontact communication with the external proximity noncontact communication card 400, the switching controlling portion 4 controls respective switches in such a way that the switch S2 is connected to GND and the switch S1 is disconnected from GND. The switch S1 shown in FIG. 3 may be constructed by a resistor R and a diode D shown in FIG. 3. The switch S2 may be formed by a circuit shown in FIG. 3. It is of course that the switch S1 and the switch S2 may be formed by a circuit different from that in FIG. 3. As shown in FIG. 4, both the switch S1 and the switch S2 may be installed into the proximity noncontact communication controlling portion 5.

As explained above, since the unused tuning circuit out of two antenna tuning circuits 3A, 3B is set in its inoperative state under control of the switching controlling portion 4 in response to the external proximity noncontact communication equipment, a resonance frequency of the antenna is shifted and thus a coupling of the unused antenna to the used antenna is reduced. Also, since the switches S1, S2 used not to operate the antenna tuning circuits 3A, 3B are provided to the portions where the influence on a gain of the antenna can be suppressed to the lowest minimum, a desired distance in the proximity noncontact communication can be ensured. In addition, a size of the antenna can be reduced.

Second Embodiment

Next, a second embodiment of the present invention will be explained in detail with reference to FIG. 5 hereunder. In the present embodiment, the same reference symbols are affixed to the same portions as those in the first embodiment and their redundant explanation will be omitted herein.

In the present embodiment, unlike the first embodiment, a terminal of the second tuning capacitor 32, which is opposite to a terminal that is connected to the antenna connection terminal 52, is connected to a switch S3 that is connected to GND or disconnected from GND, and a connecting or disconnecting operation of the switch S3 with respect to GND is controlled by the switching controlling portion 4.

Here, like the first embodiment, when particularly the proximity noncontact communication is started, the antenna and the antenna tuning circuit must be designed to resonate with a specified frequency. In this case, the first antenna 2A used as the external proximity noncontact communication equipment antenna acts as an inductance component, and the first tuning capacitor 34 and the second tuning capacitors 35; 36 are designed in total to resonate with a specified frequency. Therefore, if a part of the antenna tuning circuit 3 is constructed not to operate, a resonance frequency can be shifted from the specified frequency. In other words, the resonance frequency can be changed into a frequency that is different from a resonance frequency of the second antenna 2B arranged on the same plane, and a coupling between the first antenna 2A and the second antenna 2B can be reduced.

Also, like the first embodiment, the antenna tuning circuit to which the first tuning capacitor 31 is provided needs a high quality factor Q in the first antenna tuning circuit. Therefore, for example, when the switch S1 is provided to the first tuning capacitor 31, a quality factor Q of the first antenna tuning circuit 2A is deteriorated in the communication with the external proximity noncontact communication equipment equipped with the first antenna 2A. As a result, a gain of the antenna is deteriorated and a communicable range in the proximity noncontact communication is reduced. Therefore, the present invention is constructed such that the switches S1, S3 are provided to the circuit to which the second tuning capacitors 32, 33 that exerts no influence upon a gain of the antenna are provided.

Also, in the present embodiment, two second tuning capacitors 32, 33 of the first antenna provided to the communication equipment tuning circuit 3A are not operated. Therefore, a resonance frequency of the first antenna 2A can be shifted larger than the first embodiment, and a coupling of the first antenna 2A to the second antenna 2B arranged on the same plane can be reduced largely.

Also, in the present embodiment, unlike the first embodiment, a terminal of the second tuning capacitor 35, which is opposite to a terminal that is connected to the antenna connection terminal 54, is connected to a switch S4 that is connected to GND or disconnected from GND. A connecting or disconnection operation of this switch S4 with respect to GND is controlled by the switching controlling portion 4.

Here, like the first embodiment, when particularly the proximity noncontact communication is started, the antenna and the antenna tuning circuit must be designed to resonate with a specified frequency. In this case, the second antenna 2B used as the external proximity noncontact communication card antenna acts as an inductance component, and the first tuning capacitor 34 and the second tuning capacitors 35, 36 are designed in total to resonate with a specified frequency. Therefore, if a part of the antenna tuning circuit 3 is constructed not to operate, a resonance frequency can be shifted from the specified frequency. In other words, the resonance frequency can be changed into a frequency that is different from a resonance frequency of the first antenna 2A arranged on the same plane, and a coupling between the first antenna 2A and the second antenna 2B can be reduced.

Also, like the first embodiment, the first tuning capacitor 34 needs a high quality factor Q in the communication card tuning circuit 3B. Therefore, when the switch S2 is provided to the circuit to which the first tuning capacitor 34 is provided, a quality factor Q of the antenna tuning circuit is deteriorated in the communication with the external proximity noncontact communication card equipped with the second antenna 2B. As a result, a gain of the antenna is deteriorated and a communicable range in the proximity noncontact communication is reduced. Therefore, the present invention is constructed such that the switches S2, S4 are provided to the circuit to which the second tuning capacitors 35, 36 that exerts no influence upon a gain of the antenna are provided.

Also, two second tuning capacitors 35, 36 of the second antenna are not operated during the operation of the first antenna 2A. Therefore, a resonance frequency of the second antenna 2B can be shifted larger than the first embodiment, and a coupling of the second antenna 2B to the first antenna 2A arranged on the same plane can be reduced largely.

As a result, according to the present embodiment, when the mobile communication device 1 performs the proximity noncontact communication with the external proximity noncontact communication equipment 300, the switching controlling portion 4 controls respective switches such that the switch S1 and the switch S3 are connected to GND and the switch S2 and the switch S4 are disconnected from GND.

Also, when the mobile communication device 1 of the present embodiment performs the proximity noncontact communication with the external proximity noncontact communication card 400, the switching controlling portion 4 controls respective switches such that the switch S2 and the switch S4 are connected to GND and the switch S1 and the switch S3 are disconnected from GND.

Figure 3:
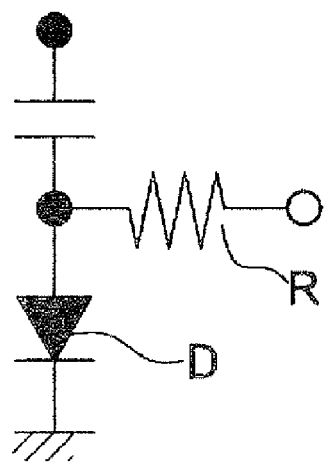
FIG. 3 A diagram showing a pertinent configuration of a switch in the mobile communication device according to the first embodiment of the present invention.
Figure 4:
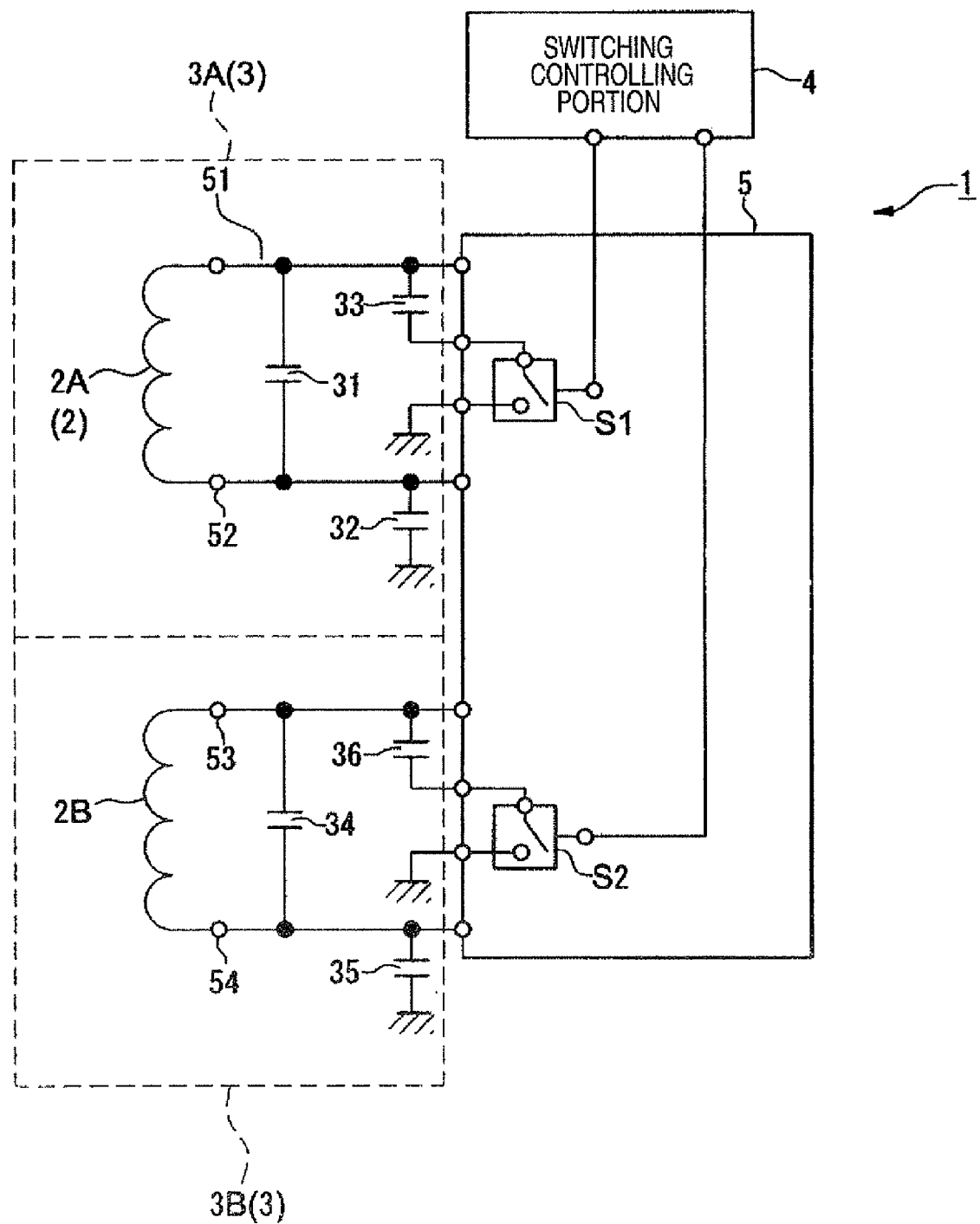
FIG. 4 A block diagram showing a pertinent configuration of a variation of the proximity noncontact communication portion of the mobile communication device according to the first embodiment of the present invention.
Figure 5:
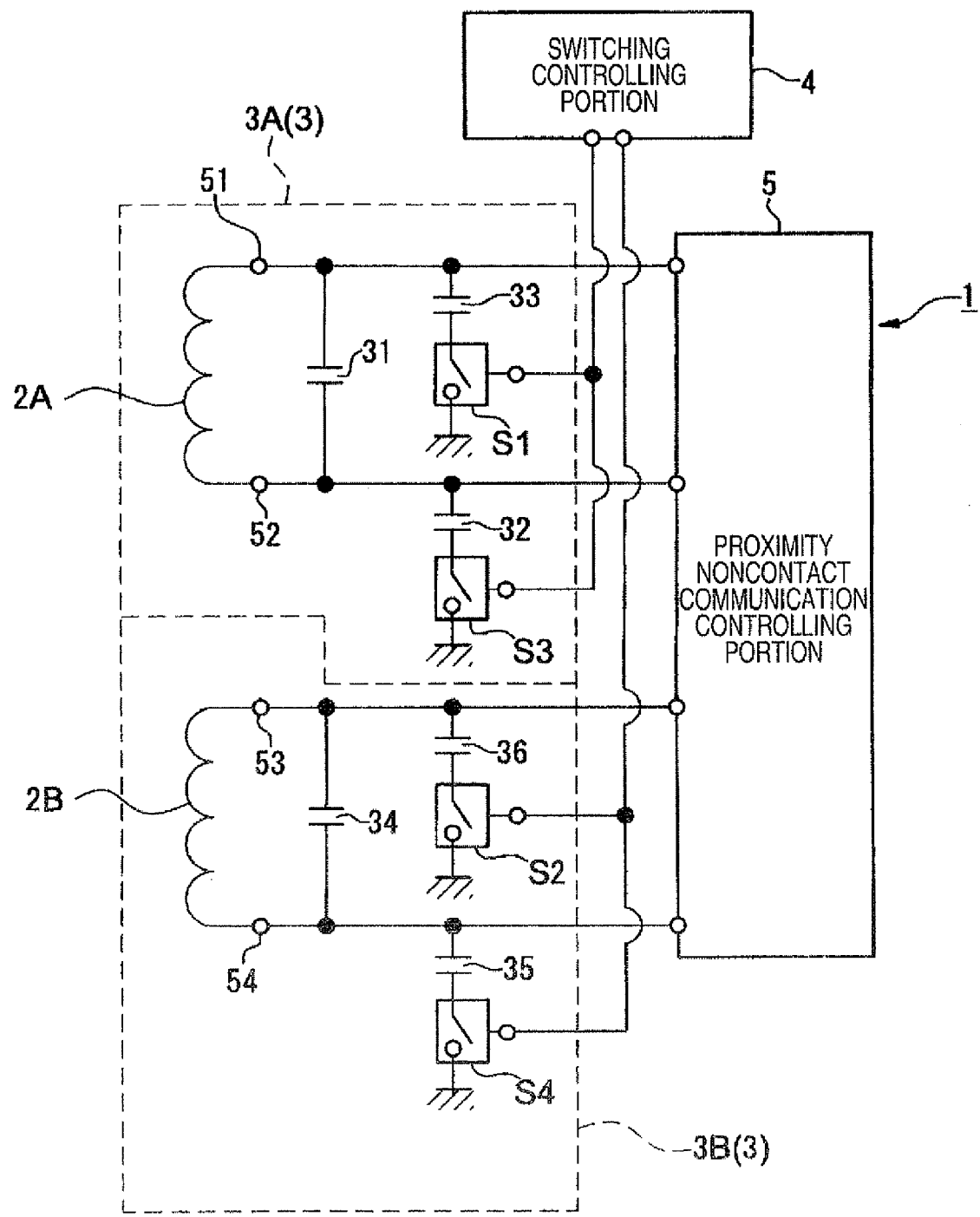
FIG. 5 A block diagram showing a configuration of a proximity noncontact communication portion of a mobile communication device according to a second embodiment of the present invention.

Also, like the first embodiment, the switch S1 shown in FIG. 5 may be constructed by the resistor R and the diode D shown in FIG. 3. The switch S2 to the switch S4 may also be formed by the circuit shown in FIG. 3. It is of course that the switch S1 to the switch S4 may be formed by a circuit different from that in FIG. 3. Also, four switches of the switch S1 to the switch S4 are provided in total in FIG. 5, but only three switches of them may be provided. Also, like the first embodiment, the switch S1, the switch S3 and the switch S2, the switch S4 may be installed into the proximity noncontact communication controlling portion 5 shown in FIG. 4.

As explained above, since the unused tuning circuit out of two antenna tuning circuits 3A, 3B is set in its inoperative state under control of the switching controlling portion 4 in response to the external proximity noncontact communication equipment, a resonance frequency of the antenna is shifted and thus a coupling of the unused antenna to the used antenna is reduced. Also, since the switches S used not to operate the tuning circuits 3A, 3B are provided to the portions where the influence on a gain of the antenna can be suppressed to the lowest minimum, a desired distance in the proximity noncontact communication can be ensured. In addition, a size of the antenna can be reduced.

Here, the present invention is not limited to the above embodiments at all, and can be embodied in various modes without departing from a gist of the invention.

The present invention is explained in detail with reference to the particular embodiments. But it is apparent for those skilled in the art that various variations and modifications can be applied without departing from a spirit and a scope of the present invention.

This application is based upon Japanese Patent Application (Patent Application No. 2005-112248) filed on Apr. 8, 2005; the entire contents of which are incorporated herein by reference.

INDUSTRIAL APPLICABILITY

The mobile communication device of the present invention possesses such an advantage that a reduction in an available distance in performing the proximity noncontact communication due to the coupling between plural antennas can be avoided even when plural antennas are provided to correspond to a plurality of external equipments, and is useful to the mobile communication device having a card function or a reader/writer function used in the communication system that establishes communication by utilizing an electric field or a magnetic field, and the like.

The invention claimed is:
1. A mobile communication device, comprising:
a noncontact communication portion that performs a noncontact communication with a plurality of external equipments, the noncontact communication portion including:
(i) a control portion;
(ii) a first antenna coupled to the control portion through a first pair of terminals, the first antenna being configured by a first antenna tuning circuit to resonate at a first frequency;
(iii) a second antenna coupled to the control portion through a second pair of terminals, the second antenna being configured by a second antenna tuning circuit to resonate at a second frequency, the second antenna tuning circuit including:
a first capacitor that is arranged between the second pair of terminals;
a second capacitor that is arranged between the first capacitor and the control portion;
a third capacitor that is arranged between the first capacitor and the control portion, wherein the third capacitor connects with the first capacitor via one common node, and connects to ground via another node; and
a switch provided for the second capacitor, while no switch is provided for the first capacitor nor for the third capacitor; and
(iv) a switching unit capable of opening and closing the switch for the second capacitor according to a type of at least one of the plurality of external equipments in communication with the noncontact communication portion, the switching unit further capable of switching the second antenna to resonate at the second frequency by closing the switch and at a third frequency different from the second frequency by opening the switch.

2. The mobile communication device of claim 1, wherein the switching unit is further capable of controlling the second antenna tuning circuit when the noncontact communication portion performs the noncontact communication with one of the plurality of external equipments using the first antenna to cause the second antenna to resonate at the third frequency, and a difference between the first frequency and the third frequency being more than a difference between the first frequency and the second frequency.

3. The mobile communication device of claim 2, the one of the plurality of external equipments being an external noncontact communication card.

4. The mobile communication device of claim 1 wherein the first antenna tuning circuit includes,
a fourth capacitor that is arranged between the first pair of terminals;
a fifth capacitor that is arranged between the fourth capacitor and the control portion;
a sixth capacitor that is arranged between the fourth capacitor and the control portion, wherein the sixth capacitor connects with the fourth capacitor via one common node, and connects to ground via another node; and
a switch provided for the fifth capacitor, while no switch is provided for the fourth capacitor nor for the sixth capacitor, and
the switching unit is further capable of opening and closing the switch for the fifth capacitor according to the type of at least one of the plurality of external equipment in communication with the noncontact communication portion, and switching the first antenna to resonate at the first frequency by closing the switch and at a fourth frequency different from the first frequency by opening the switch.

* * * * *